United States Patent
Maskatiya et al.

(10) Patent No.: US 7,827,088 B2
(45) Date of Patent: Nov. 2, 2010

(54) DATA GATHERING AT DELIVERY OF GOODS

(75) Inventors: Karim Maskatiya, Miami Beach, FL (US); Robert P. Cucinotta, Miami Beach, FL (US)

(73) Assignee: USA Payments, Inc., San Mateo, CA (US)

( * ) Notice: Subject to any disclaimer, the term of this patent is extended or adjusted under 35 U.S.C. 154(b) by 1367 days.

(21) Appl. No.: 09/910,462

(22) Filed: Jul. 20, 2001

(65) Prior Publication Data

US 2003/0018565 A1    Jan. 23, 2003

(51) Int. Cl.
*G06Q 40/00* (2006.01)
(52) U.S. Cl. .......................................... 705/37; 705/35
(58) Field of Classification Search ................... 705/35, 705/36, 37, 26; 235/375, 384; 345/173, 345/179
See application file for complete search history.

(56) References Cited

U.S. PATENT DOCUMENTS

| | | | |
|---|---|---|---|
| 5,208,446 A | * | 5/1993 | Martinez ..................... 235/380 |
| 5,313,051 A | * | 5/1994 | Brigida et al. ............... 235/375 |
| 6,974,928 B2 | * | 12/2005 | Bloom ........................ 209/583 |

* cited by examiner

*Primary Examiner*—Ojo O Oyebisi
(74) *Attorney, Agent, or Firm*—Townsend and Townsend and Crew LLP

(57) ABSTRACT

Systems and methods for delivering goods and services from a provider to a receiver. The method includes placing an order for goods to the provider and providing the goods to a deliverer. The deliverer delivers the goods to the receiver. The deliverer then obtains at least one piece of data from the receiver at the time of delivery. The at least one piece of data is from a group comprising a credit card number, a debit card number, the information on the magnetic strip of a credit card, the information on the magnetic strip of a debit card, devices that store information that may be read by infra red, magnetic waves and/or radio waves, a check, a money order, a gift certificate, an electronic signature, and a copy of a piece of identification of the receiver. The at least one piece of data is then provided to a processor who handles payment to the provider.

11 Claims, 1 Drawing Sheet

__US 7,827,088 B2__

DATA GATHERING AT DELIVERY OF GOODS

BACKGROUND OF THE INVENTION

1. Field of the Invention

The present invention relates to a system and method for the purchase and delivery of goods, and more particularly, systems and methods wherein data pertinent to payment for the goods is gathered from a recipient of the goods by a delivery person.

2. Description of the Prior Art

Goods and services have long been purchased by consumers and businesses by going to stores, warehouses, etc. and/or by having them delivered. Eventually, goods and services were able to be purchased from providers over the telephone. Depending upon what was purchased, delivery may be necessary.

Recently, with the advent of the Worldwide Web or Internet, many businesses are based upon, or at least include, a website where goods and services may be purchased. When consumers, groups, businesses, etc. purchase goods or services over the Internet, once again, depending upon what was purchased, delivery may be required.

Obviously, when a provider sells goods or services to a recipient, the provider wishes to be paid. When the recipient actually goes to the provider, the provider is generally paid prior to handing over the goods to the recipient. Payment is generally with cash, checks, credit cards, debit cards, etc. There are numerous ways for the provider to verify that the recipient's mode of payment is acceptable.

When goods or services were initially delivered to recipients, i.e., when they were ordered over the phone or by mail, often the goods or services were delivered as "cash on delivery" or C.O.D. With this method, the merchant has less ability and control in verifying the appropriateness of the recipient's payment. It also gives the recipient fewer payment methods or options. Accordingly, for C.O.D. transactions, merchants generally require that the delivery person obtain a cashier-check or money order in exchange for the delivery items.

Generally, with transactions handled over the Internet, the merchant website handles obtaining the appropriate payment by the intended recipient. This can cause problems with security issues. Indeed, many people do not wish to purchase items over the Internet for fear of numerous security issues. Furthermore, such transactions can slow the responsiveness of the website. Additionally, the transaction time is often too long for the recipient while the recipient waits for the provider to verify the recipient's payment method.

SUMMARY OF THE INVENTION

The present invention provides systems and methods for delivering at least one item or service from a provider to a receiver. The method includes placing an order for the at least item or service to the provider and providing the at least one item or service to a deliverer. The deliverer delivers the at least one item or service to the receiver. The deliverer then obtains at least one piece of data from the receiver at the time of delivery. The at least one piece of data is from a group comprising a credit card number, the information contained on the magnetic strip of a credit card, the information contained on the magnetic strip of a debit card, a debit card number, the information contain on a chip card, a check, a money order, a gift certificate, an electronic signature, a copy of a piece of identification of the receiver, and a purchase order. The at least one piece of data is then provided to a financial processor which then handles payment for the at least one item or service to the provider.

In accordance with one aspect of the present invention, the at least one piece of data is provided to the provider prior to providing the at least one piece of data to the financial processor.

In accordance with another aspect of the present invention, the at least one piece of data is provided to the financial processor substantially immediately upon receipt at delivery.

In accordance with a further aspect of the present invention, the at least one piece of data is provided to the financial processor with other pieces of data from other transactions.

In accordance with yet another aspect of the present invention, the financial processor preapproves the order based upon preliminary financial information and the deliverer obtains financial information to finalize payment.

The present invention also provides systems and methods wherein a recipient of a product or service requests the product or service from a provider and gives a delivery address to the provider. The address is then provided to a deliverer who delivers the product or service to the recipient. The deliverer obtains financial information from the recipient for payment purposes. The financial information is forwarded a financial processor.

Thus, the present invention provides systems and methods for delivering goods and/or services to consumers wherein the delivery person obtains enough data from the recipient in order to enable a processor to complete the financial portion of the transaction. This can remove a majority of the burden of obtaining such data from the merchant or provider. Furthermore, it may reduce the amount of time required for placing the order. Finally, the delivery person can help ensure the appropriate party is receiving the goods and services.

Other features and advantages of the present invention will be understood upon reading and understanding the detailed description of the preferred exemplary embodiments found herein below, in conjunction with reference to the drawings, in which like numerals represent like elements.

DESCRIPTION OF SPECIFIC EXEMPLARY EMBODIMENTS

Figure 1:
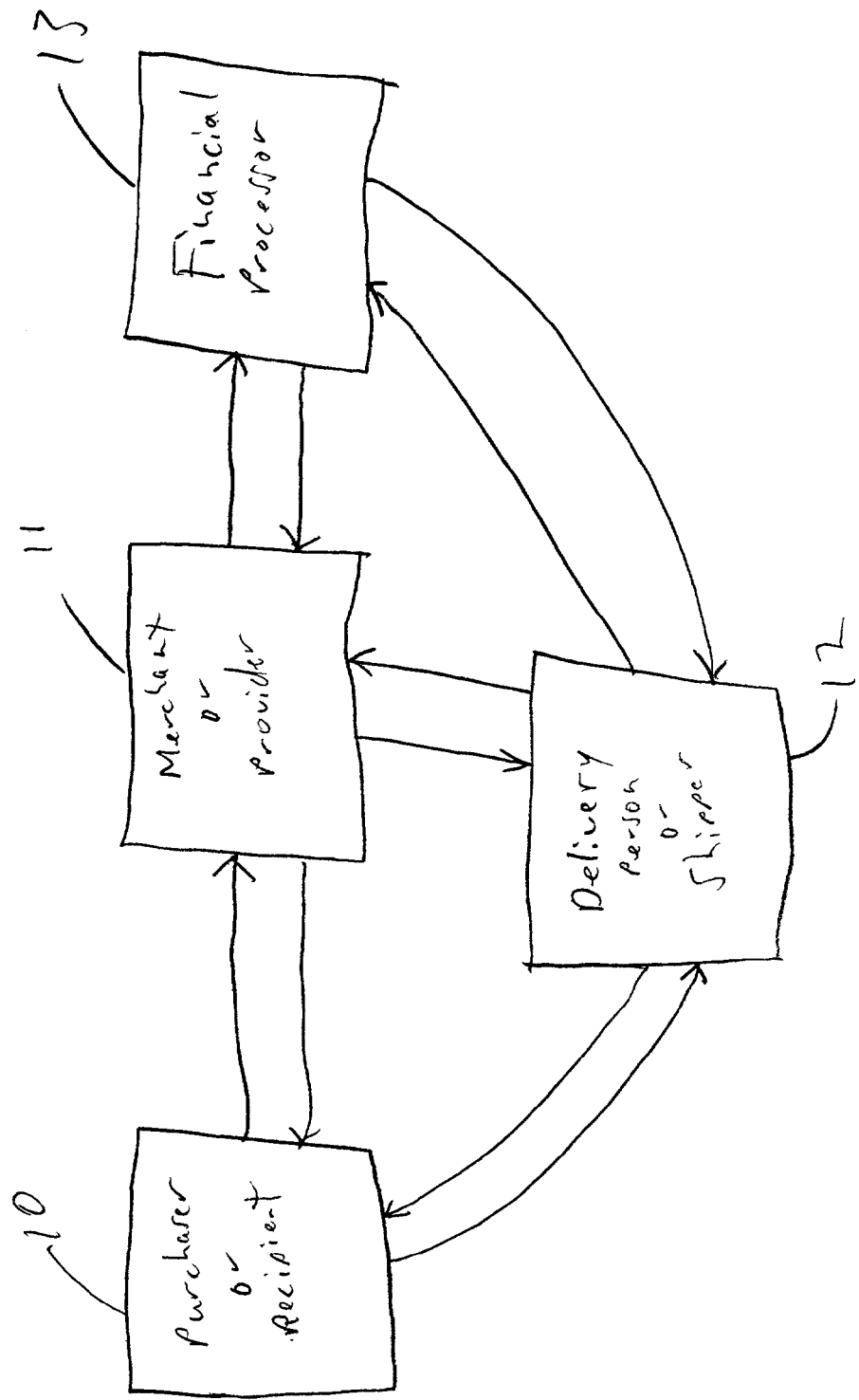
FIG. 1 is flowchart schematically illustrating the systems and methods of the present invention.

FIG. 1 schematically illustrates an arrangement of a purchaser or recipient, a merchant or provider 11, a shipper or delivery person 12, and a financial processor 13.

In accordance with the present invention, the purchaser desires to purchase an item or service. For example, the purchaser wishes to purchase a book from the merchant. The purchaser contacts the merchant via the Internet, phone, radio, or other suitable form of communication. The purchaser then provides information regarding the desired book and the delivery address to the merchant. The merchant then provides the book, or causes the book to be provided, to the shipper or delivery person, who in turn delivers the book to the purchaser.

In accordance with the present invention, upon delivery of the book to the purchaser, one or more pieces of data are obtained by the delivery person from the purchaser. These pieces of data are used to complete the financial portion of the transaction between the purchaser and the merchant. The pieces of data may include a credit card number, a debit card number, the information contained on the magnetic strip of a credit card, the information contained on the magnetic strip of a debit card, the information contain on a chip card (smart card), a check, chip card information, a money order, devices that store information that may be read by infra red, magnetic waves and/or radio waves, verification of a purchase order, and a gift certificate or gift certificate number. Additionally, an electronic signature is preferably obtained from the purchaser. The delivery person may also obtain a copy of a piece of identification such as, for example, a driver's license, a state I.D., a military I.D, or pass port In one embodiment of the present invention, the obtained piece(s) of data are forwarded to the processor for approval of the financial portion of the transaction at the time of delivery. If for some reason the financial transaction is not approved by the processor, the delivery person is then able to take the goods with him. The processor then handles payment for the book to the merchant based upon the obtained piece(s) of data. The financial processor preferably handles payment for book to the merchant online based upon the obtained data and any necessary authorizations.

In an alternative embodiment, the data obtained by the delivery person is provided after delivery of the good(s) or service(s) to the merchant or financial processor. This allows the delivery person not to have to send the information on a real time basis to complete the transaction. Additionally, the merchant may wish to hold pieces of data from various transactions and forward them to the processor in groups or batches. This is generally done offline. Once again, the financial processor handles payment for the transaction(s) either in real time or in batches to the merchant based upon the obtained piece(s) of data and when and how (realtime or batches) it is sent to the financial processor.

In another embodiment, upon placing the order, the purchaser may receive a reference number, tracking number, authorization number, etc. This number may be used as an identifier indicating that the purchaser has been preapproved or has an account with the processor and thus, payment may be made from the processor to the merchant upon delivery of the goods or services. The preauthorization may also be based upon providing some type of financial information to the merchant and/or the financial processor at the time of ordering. At delivery, the same or different financial information may be obtained by the deliverer as discussed previously.

Additionally, a purchase order-type document may be provided to the purchaser at the time of ordering, which may then be matched at the delivery with a copy that the deliverer has.

Preferably, the data is forwarded by the delivery person to the merchant or processor immediately via a handheld computer-type device. The computer-type device may include a magnetic card reader that allows the delivery person to "swipe" credit cards, debit cards, etc. The computer-type device also preferably includes inputs such as keys, touch screens, or other known computing inputs. The computer-type device also preferably will be able to communicate with smart cards.

Preferably, the computer-type device is able to communicate with the merchant and/or processor. This may be accomplished in numerous ways such as, for example, the Internet, phone lines, cellular, radio, satellite, and other suitable communication channels.

Accordingly, the present invention provides systems and methods that allow for the purchase and delivery of goods and/or services wherein the delivery person obtains data that allows for the completion of the financial portion of the transaction. The processor generally provides pre-approval for payment of the delivered goods or services helping eliminate nonpayment to the merchant. This allows for reduction in fraud, nonpayment for goods and/or services, and may help streamline the ordering process.

Although the present invention has been described with reference to specific exemplary embodiments, it will be appreciated that it is intended to cover all modifications and equivalents within the scope of the appended claims.

What is claimed is:

1. A method of delivering at least one item or service from a provider to a receiver, the method comprising:

receiving an order for at least one item or service available from the provider, the order identifying a receiver to which to deliver the at least one item or service, the order being received without financial information for a purchaser for the order;

determining whether the purchaser of the order is pre-approved by a financial processor or has an account with the financial processor, wherein the financial processor is able to provide payment for the at least one item or service upon the delivery of the at least one item or service;

if the purchaser is determined to be pre-approved or to have an account with the financial processor, generating an order identifier associated with the order to be provided to at least one of the purchaser and the receiver, the order identifier not including financial information for the purchaser;

obtaining the order identifier from the receiver at substantially a time of delivery;

providing information regarding the order identifier obtained at substantially the time of delivery to the financial processor, for approval of a financial portion of the order, without providing any financial information to the financial processor;

in response to the financial portion of the order being approved by the financial processor, such that payment for the order will be provided to the provider, delivering the at least one item or service to the receiver; and in response to the financial portion of the order being denied by the financial processor, not delivering the at least one item or service to the receiver, wherein the at least one item or service is capable of being ordered and delivered without requiring financial information to be received by the provider or the deliverer from the purchaser or the receiver.

2. A method in accordance with claim 1 wherein the information regarding the order identifier is provided to the provider prior to providing the information regarding the order identifier to the financial processor.

3. A method in accordance with claim 1 wherein the information regarding the order identifier is provided to the financial processor substantially immediately upon receipt at the time of delivery.

4. A method in accordance with claim 1 wherein the information regarding the order identifier is provided to the financial processor with other information from other transactions.

5. A system for delivering at least one item or service from a provider to a receiver, the system comprising:

a provider device for a provider offering at least one of an item or a service, the provider device being operable to:

receive an order for the at least one item or service from the receiver without receiving financial information for the receiver;

determine whether the receiver of the order is pre-approved by a financial processor or has an account with the financial processor, wherein the financial processor is able to provide payment for the at least one item or service upon the delivery of the at least one item or service;

if the receiver is determined to be pre-approved or to have an account with the financial processor, generate an order identifier associated with the order to be provided to the receiver, the order identifier not including financial information for the receiver;

at least one communication channel for providing communication between the provider and at least one of a deliverer, a financial processor, and the receiver of the at least one item or service; and a data gathering device for transmitting data about the order identifier obtained by the deliverer at substantially a time of delivery of the at least one item or service to at least one of the provider and the financial processor, the data being provided to the financial processor for approval of a financial portion of the order, the transmitted data not including any financial information for the receiver, wherein in response to the data being approved by the financial processor, payment is provided for the at least one item or service from the financial processor to the provider and the at least one item or service is delivered to the receiver, wherein in response to the data being not approved by the financial processor, the at least one item or service is not delivered to the receiver, and wherein the at least one item or service is capable of being ordered and delivered without requiring financial information to be received by the provider or the deliverer from the receiver.

6. A method for obtaining payment for an item or service near the time of delivery without requiring a purchaser to provide financial information, comprising:

obtaining an order identifier from the intended recipient of at least one of an item and a service at substantially a time of delivery for the item or service, the order identifier being received by the intended recipient when a purchaser of the order is pre-approved or has an account with a financial processor, the order identifier being generated without receiving financial information for the purchaser of the order when it is determined that the purchaser of the order is pre-approved by a financial processor or has an account with the financial processor, the order identifier not including financial information for the purchaser, wherein the financial processor is able to provide payment for the at least one item or service upon the delivery of the at least one item or service;

providing the obtained order identifier to one of a financial processor and a provider of the item or service;

in response the order identifier being approved by the financial processor, such that payment is able to be provided for the at least one item or service from the financial processor to the provider, receiving approval to deliver the item or service to the intended recipient; and in response to the information being not approved by the financial processor, receiving an indication to not deliver the at least one item or service to the receiver, wherein the at least one item or service is capable of being ordered and delivered without requiring financial information to be received by the provider or the deliverer from the receiver or the purchaser.

7. A method according to claim 6, wherein:

obtaining an order identifier includes obtaining at least one piece of data selected from the group consisting of a reference number, a tracking number, an authorization number, a purchase order number, and a purchase order-type document.

8. A method according to claim 6, wherein:

providing the obtained order identifier to one of a financial processor and a provider of the item or service includes transmitting the obtained order identifier to one of a financial processor and a provider of the item or service at substantially the time of delivery.

9. A method in accordance with claim 1 wherein the order identifier is selected from the group consisting of a reference number, a tracking number, an authorization number, a purchase order number, and a purchase order-type document.

10. A system in accordance with claim 5 wherein the order identifier is selected from the group consisting of a reference number, a tracking number, an authorization number, a purchase order number, and a purchase order-type document.

11. A method of completing delivery of at least one item or service from a provider to a receiver, the method comprising:

receiving an order for at least one item or service available from the provider, the order identifying a receiver to which to deliver the at least one item or service, the order being received without financial information for a purchaser of the order;

determining whether the purchaser of the order is pre-approved by a financial processor or has an account with the financial processor, wherein the financial processor is able to provide payment for the at least one item or service upon the delivery of the at least one item or service;

if the purchaser is determined to be pre-approved or to have an account with the financial processor, generating an order identifier associated with the order to be provided to the purchaser, the order identifier not including financial information for the purchaser;

obtaining the order identifier at substantially a time of delivery, the order identifier being obtained from the receiver or from a deliverer receiving the order identifier from the receiver;

in response to obtaining the order identifier, providing the order identifier to a financial processor without also providing financial information for the purchaser or the receiver;

in response to the order identifier being approved by the financial processor, receiving payment for the at least one item or service from the financial processor and instructing the deliverer to deliver the at least one item or service to the receiver; and in response to the order identifier being not approved by the financial processor, instructing the deliverer to not deliver the at least one item or service to the receiver, wherein the at least one item or service is capable of being ordered and delivered without requiring financial information to be received by the provider or the deliverer from the purchaser or the receiver.

* * * * *